United States Patent
Maruoka et al.

(10) Patent No.: US 7,170,564 B2
(45) Date of Patent: Jan. 30, 2007

(54) ON-SCREEN DISPLAY DEVICE

(75) Inventors: Toshihiko Maruoka, Ikeda (JP); Keisuke Tanaka, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/752,509

(22) Filed: Jan. 8, 2004

(65) Prior Publication Data
US 2004/0165114 A1 Aug. 26, 2004

(30) Foreign Application Priority Data
Jan. 9, 2003 (JP) .............................. 2003-003475

(51) Int. Cl.
*H04N 5/445* (2006.01)
*G09G 5/22* (2006.01)
*G09G 5/36* (2006.01)
*G06T 11/00* (2006.01)
*H04N 9/76* (2006.01)
*H04N 9/74* (2006.01)

(52) U.S. Cl. ...................... 348/564; 345/467; 345/551; 345/556; 348/589; 348/600

(58) Field of Classification Search ................. 345/551, 345/555, 556, 636
See application file for complete search history.

(56) References Cited

U.S. PATENT DOCUMENTS
5,396,297 A 3/1995 Shindou et al.
5,721,568 A * 2/1998 Kim ........................ 345/467
6,480,875 B1 11/2002 Miyoshi et al.

FOREIGN PATENT DOCUMENTS
JP 9-54575 2/1997
JP 11-102352 4/1999

* cited by examiner

*Primary Examiner*—Kee M. Tung
(74) *Attorney, Agent, or Firm*—Wenderoth, Lind & Ponack, L.L.P.

(57) ABSTRACT

This invention provides an on-screen display device that can display an increased number of types of characters without enlarging the video RAM area. This on-screen display device includes a character generator ROM that has n (n is an integer that is equal to or larger than 3) areas, a flag holding unit that outputs an area designation flag for designating a desired number of desired areas among the n areas in the character generator ROM, a display character setting unit that writes a desired character code at a predetermined position in a video RAM, and a display control unit that reads the character code from the video RAM, reads font data corresponding to the read character code from an area in the character generator ROM, which is indicated by the area designation flag outputted from the flag holding unit, and outputs an on-screen output signal using the font data.

10 Claims, 6 Drawing Sheets

ON-SCREEN DISPLAY DEVICE

FIELD OF THE INVENTION

The present invention relates to on-screen display devices that can display characters.

BACKGROUND OF THE INVENTION

Television or videocassette recorders have on-screen functions of displaying information that indicates the state of the device such as channels or program of recording, on the television screen.

Initially, an on-screen display will be described with reference to FIG. 6. FIG. 6 is a diagram illustrating a structure of a conventional on-screen display.

In FIG. 6, a display character setting unit 100 writes character data that is composed of a character code of a desired character to be displayed (hereinafter, referred to as display character), and an attribute code that indicates modification information, such as the color of the display character or background thereof, at a predetermined position in a video RAM 200.

The video RAM 200 has addresses corresponding to respective positions on the display on which the display characters are to be displayed. FIG. 7 shows an address map of the video RAM 200. On a screen of the display, 12 lines of 24 characters can be displayed. In addition, character data is composed of 8 bits, 7 bits of which are character codes indicating up to 128 types, and 1 bit of which is an attribute code.

A display control unit 300 reads character data from the video RAM 200, reads font data corresponding to the character code included in the read character data, from a character generator ROM 400, and outputs an on-screen output signal using the read font data.

The character generator ROM 400 contains plural kinds of font data.

A compositing unit 500 composites an input video signal and the on-screen output signal that is outputted from the display control unit 300.

FIG. 7 shows an address map of the conventional video RAM 200. Character data of from the 1st character on the 1st line to the 24th character on the 12th line are stored at respective addresses corresponding to predetermined display positions on the display. In other words, 12 lines of 4 characters can be displayed on the screen of the display. The character data is composed of 8 bits, 7 bits of which are character codes indicating up to 128 types, and 1 bit of which is an attribute code.

The operation of the on-screen display that is constituted as described above will be described hereinafter.

First, the display character setting unit 100 writes character data of one screen, which is composed of a character code and an attribute code of a character to be displayed, at an address in the video RAM 200 corresponding to a position on the display at which the character is to be displayed, as indicated by the address map of the video RAM shown in FIG. 7.

Then, the display control unit 300 reads the character data written in the video RAM 200 at a predetermined timing, and then reads font data stored at an address that is indicated by the character code included in the character data, from the character generator ROM 400. Then, the display control unit outputs an on-screen output signal on the basis of the read font data and the attribute code that is included in the character data read from the video RAM 200, in synchronization with an input video signal. Then, the compositing unit 500 composites the on-screen output signal and the video signal to output a composite signal to the display.

As described above, a character to which desired character modification has been added can be displayed on the display. In order to further add the character modification (coloring of the display character itself, the color of the background, and the like), details of the character modification may be previously stored in the video RAM 200 (see Japanese Published Patent Application No. Hei.9-54575).

However, in the above-mentioned construction, to increase the types of characters that can be displayed, the number of bits corresponding to the character code should be increased, resulting in an extension of the area in the video RAM 200 for holding the character code. Particularly in cases where the video RAM area is commonly used as a RAM area of the CPU (see Japanese Published Patent Application No. Hei.11-102352), and when the bit length of character data is larger than the bit length of data that is accessed to the RAM of the CPU, the video RAM area is doubled in size. More specifically, when the bit length of data accessed to the RAM of the CPU is 8 bits and the character code are 8 bits, the character data is composed of 9 bits including 1-bit attribute code. Therefore, two addresses are required for one character as shown in FIG. 8, thereby doubling a required video RAM area.

SUMMARY OF THE INVENTION

The present invention has for its object to provide an on-screen display device that is capable of achieving an increase in the number of character types without enlarging the video RAM area for displaying the characters.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the Present invention, there is provided an on-screen display device that provides an on-screen display of a display character, including: a character generator ROM having n pieces of areas from 1st to nth areas (n is an integer that is equal to or larger than 3), and storing predetermined font data in the respective areas; a flag holding unit for outputting an area designation flag that designates a desired number of areas among the n pieces of areas in the character generator ROM; a display character setting unit for writing a desired character code at a predetermined position in a video RAM; and a display control unit for reading the character code from the video RAM, reading font data corresponding to the character code from an area designated by the area designation flag in the character generator ROM, and outputting an on-screen output signal using the font data at a predetermined timing with respect to an input video signal. Therefore, this device has an area designation flag in addition to the character code corresponding to one character, which is held in the video RAM, whereby the number of types of characters can be increased without enlarging an area that is used in the video RAM.

According to a 2nd aspect of the present invention, there is provided an on-screen display device that provides an on-screen display of a display character, including: a character generator ROM having n pieces of areas from 1st to n-th areas (n is an integer that is equal to or larger than 3), and storing predetermined font data in the respective areas;

a flag holding unit for outputting an area designation flag that designates any of the 2nd to n-th areas among the n pieces of areas in the character generator ROM; a display character setting unit for writing a desired character code at a predetermined position in a video RAM; and a display control unit for reading the character code from the video RAM, and when the area designation flag outputted from the flag holding unit designates the second area, reading respective font data corresponding to the character code that has been read from the video RAM, from the first and second areas in the character generator ROM, while when the area designation flag outputted from the flag holding unit designates the third area, reading respective font data corresponding to the character code that has been read from the video RAM, from the first and third areas in the character generator ROM, and outputting an on-screen output signal using the read font data at a desired timing with respect to an input video signal. Therefore, the device has an area designation flag in addition to the character code corresponding to one character, which is held in the video RAM, whereby the number of types of characters can be increased without enlarging the area that is used in the video RAM. Further; the character generator ROM has a common area that is commonly used regardless of the value of the area designation flag, resulting in an efficient construction of the character generator ROM.

According to a 3rd aspect of the present invention, in the on-screen display device of the 1st or 2nd aspect, the display character setting unit writes the area designation flag into the flag holding unit, and the flag holding unit outputs the area designation flag which was written by the display character setting unit. Therefore, desired areas in the character generator ROM are selectively used by utilizing the area designation flag, thereby realizing a desired character display.

According to a 4th aspect of the present invention, in the on-screen display device of the 1st or 2nd aspect, the display character setting unit writes a desired character code and a line attribute including the area designation flag into the video RAM, the display control unit reads the line attribute from the video RAM at the start of a line to be displayed, and writes the area designation flag included in the line attribute that has been read from the video RAM, into the flag holding unit, and the flag holding unit outputs the area designation flag which was written by the display control unit. Therefore, desired areas in the character generator ROM are selectively used by utilizing the area designation flag included in the attribute code, whereby the increase in the number of types of characters can be achieved without enlarging the address area in the video RAM.

According to a 5th aspect of the present invention, in the on-screen display device of the 1st or 2nd aspect, (n−1) codes (n denotes the number of areas in the character generator ROM) among plural character codes are area designation flag codes corresponding to the area designation flag, and when the character code read from the video RAM is the area designation flag code, the display control unit writes the area designation flag corresponding to the area designation flag code into the flag holding unit, and the flag holding unit outputs the area designation flag which was written by the display control unit. Therefore, desired areas in the character generator ROM are selectively used according to whether (n−1) codes among the plural character codes are area designation flag codes or not, whereby the number of types of characters can be increased without enlarging the address area in the video RAM.

According to a 6th aspect of the present invention, in the on-screen display device of the 1st or 2nd aspect, one of plural character codes is an area designation flag code, and in cases where the character code read from the video RAM is the area designation flag code, when the output from the flag holding unit is an area designation flag that designates the second area, the display control unit writes the area designation flag that designates the third area into the flag holding unit while, when the output from the flag holding unit is an area designation flag that designates the third area, writing the area designation flag that designates the second area into the flag holding unit, and the flag holding unit outputs the area designation flag which was written by the display control unit. Therefore, desired areas in the character generator ROM are selectively used according to whether one of the character codes is an area designation flag code or not, whereby the increase in the number of types of characters can be achieved without enlarging the address area in the video RAM.

DETAILED DESCRIPTION OF THE PREFERRED EMBODIMENTS

Hereinafter, embodiments of the present invention will be described with reference to the drawings. The embodiments shown here are exemplary only, and the present invention is not limited to these embodiments.

[Embodiment 1]

An on-screen display device according to a first embodiment of the present invention will be described with reference to FIGS. 1, 2 and 7.

Figure 1:
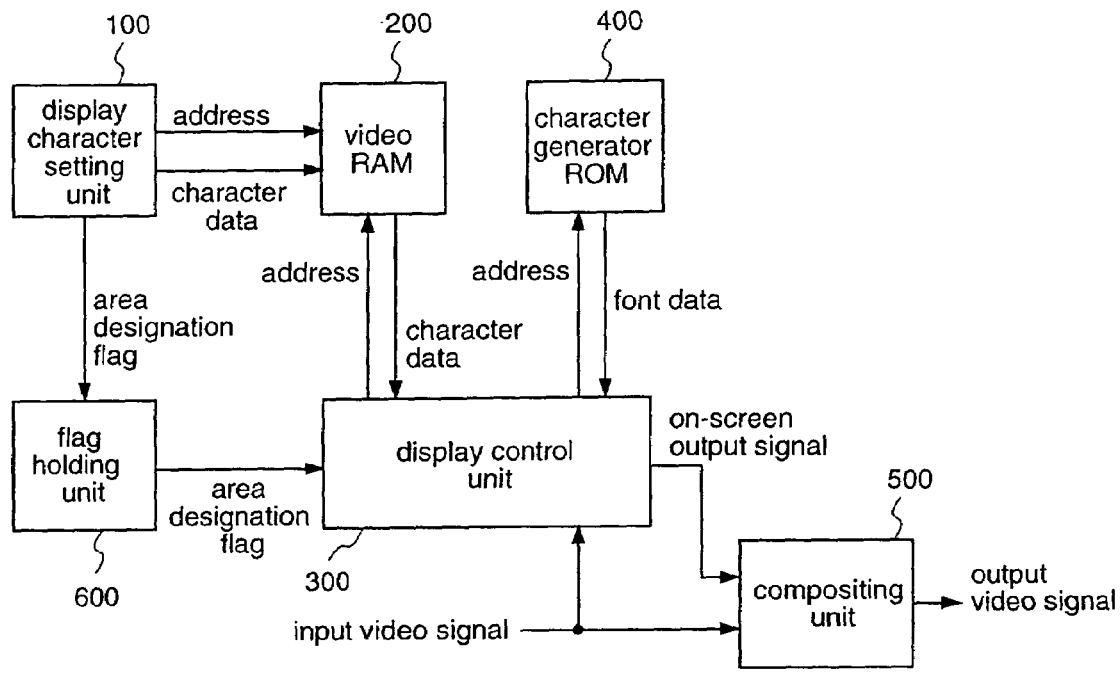
FIG. 1 is a diagram illustrating a structure of an on-screen display device according to a first embodiment of the present invention.
Figure 6:
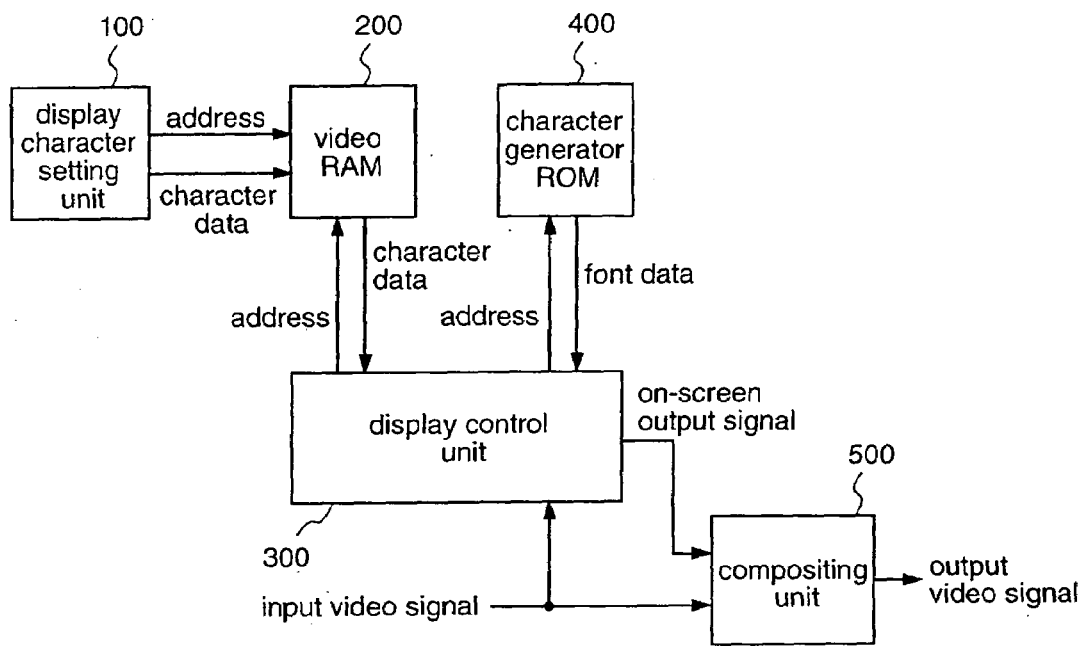
FIG. 6 is a diagram illustrating a structure of a conventional on-screen display device.

FIG. 1 is a diagram illustrating a structure of an on-screen display device according to the first embodiment. In FIG. 1, the same components as those in FIG. 6 are denoted by the same reference numerals.

A flag holding unit 600 holds an area designation flag that designates a desired area in an address map of the character generator ROM 400.

Figure 2:
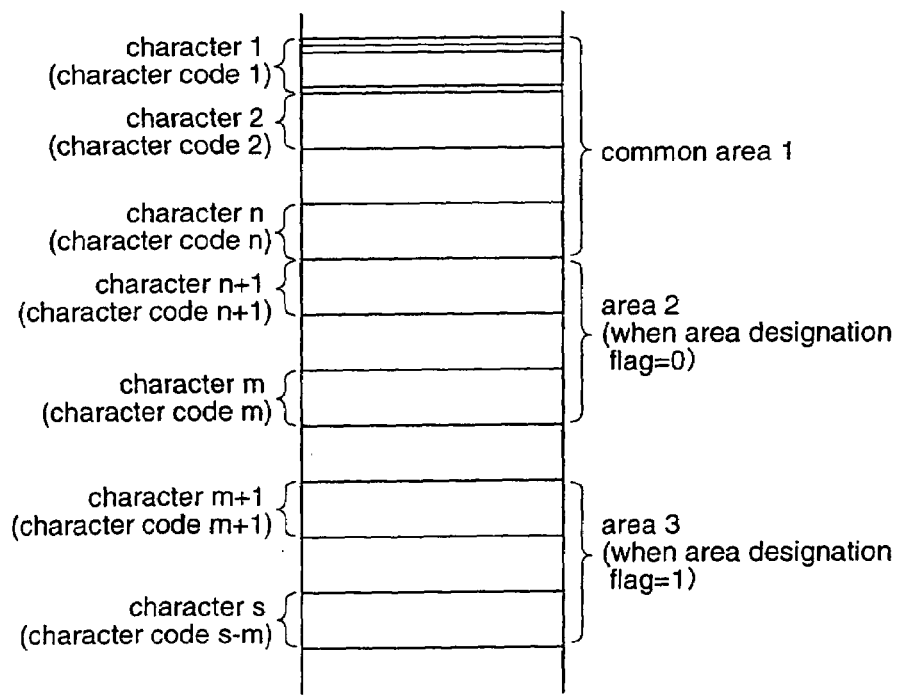
FIG. 2 is a diagram showing an address map of a character generator ROM in an on-screen display device according to any of first to third embodiments of the present invention.

FIG. 2 is a diagram showing an address map of the character generator ROM 400 in the on-screen display device according to the first embodiment.

The address map of the character generator ROM 400 includes a common area 1 for storing font data of character 1 to character n, an area 2 for storing font data of character n+1 to character m, and an area 3 for storing font data of character m+1 to character s.

Figure 7:
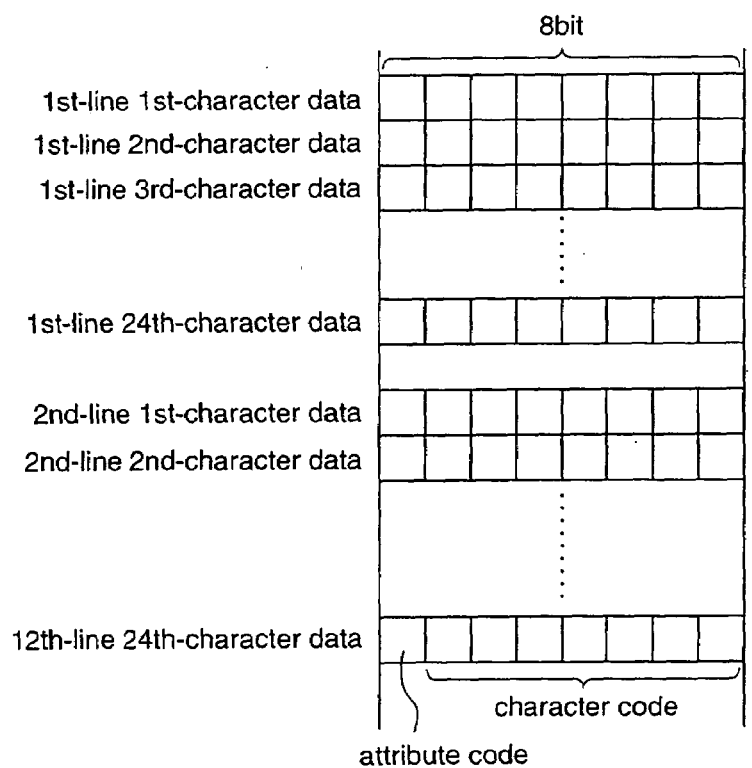
FIG. 7 is a diagram showing an address map of a video RAM in the conventional on-screen display device or the on-screen display device according to any of the first to third embodiments.
Figure 8:
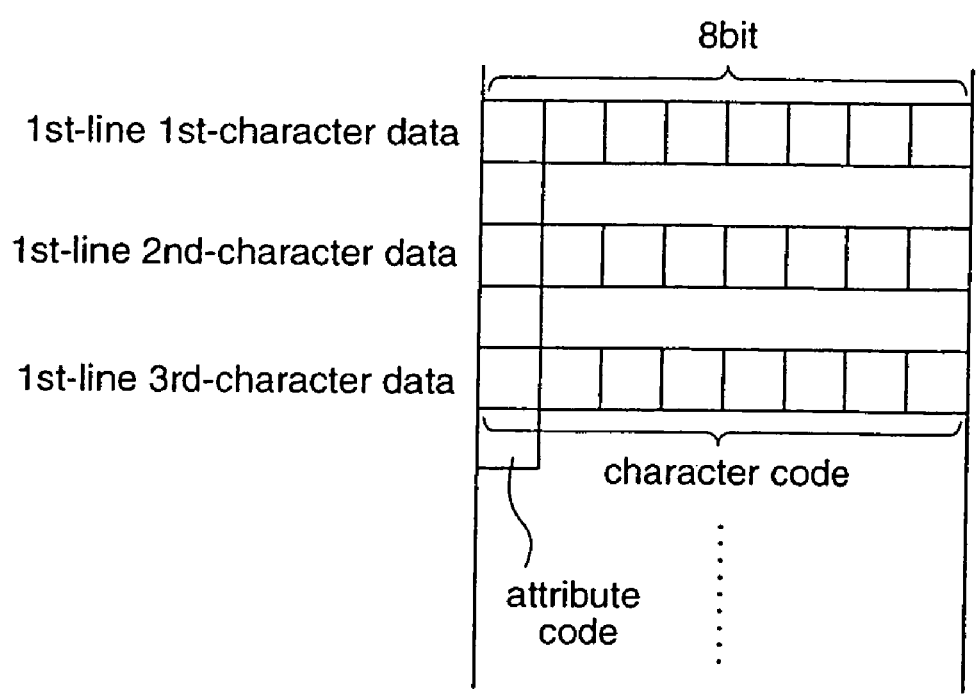
FIG. 8 is a diagram showing an address map of a video RAM in a case where the number of bits corresponding to the character code is increased by 1 bit.

In this first embodiment, the conventional address map of FIG. 7 is employed as the address map of the video RAM 200.

The operation of the on-screen display device that is constructed as described above will be described.

First, the display character setting unit 100 writes character data of a character that is to be displayed on the display into the video RAM 200, and writes an area designation flag into the flag holding unit 600. Then, the area designation flag is outputted from the flag holding unit 60, to the display control unit 300.

The display control unit 300 reads the character data that is written in the video RAM 200 at a predetermined timing. Then, the display control unit 300 reads font data that is stored in an area designated by the area designation flag outputted from the flag holding unit 600, and font data stored at an address indicated by the character code included in the character data, from the character generator ROM 400. Then, the display control unit 300 outputs an on-screen output signal on the basis of the read font data and the attribute code included in the character data that is read from the video RAM 200, in synchronization with the input video signal. Then, the compositing unit 500 composites the on-screen output signal and the input video signal to output the composite signal to the display.

Here, reading of the font data that is stored at the respective address in the address map of the character generator ROM as shown in FIG. 2 will be described.

Initially, as for characters 1 to n, font data corresponding to character codes 1 to n are read, respectively, regardless of the value of the area designation flag that is held in the flag holding unit 600.

As for characters n+1 to m, font data corresponding to character codes n+1 to m (n<m) are read, respectively, when the area designation flag is 0.

Further, as for characters m+1 to s, font data corresponding to character codes n+1 to s−m (m<s) are read, respectively, when the area designation flag is 1.

As described above, the number of types of the characters that can be displayed on one screen is m (i.e., from characters 1 to m), or s−m+n (i.e., from characters 1 to n and characters m+1 to s), while the total number of types of the characters that can be displayed on plural screens is s.

On the other hand, the character code corresponding to one character, which is required in the video RAM 200 may be the larger one of $\log_2 m$ bits and $\log_2(s-m+n)$ bits. For example, when it is assumed that s=192 and it is decided that n=64 and m=125, the character code is composed of 7 bits. Accordingly, an area in the video RAM, which is used for one character can be realized by 8 bits.

As a specific example, font data of alphanumeric characters are stored in the common area 1 of FIG. 2, Japanese font data are stored in the area 2, and Korean font data are stored in the area 3, respectively, whereby the alphanumeric characters and Japanese are displayed using the common area 1 and the area 2, while the alphanumeric characters and Korean are displayed using the common area 1 and the area 3, and switching of fonts for each screen is performed on a selection screen.

As described above, the on-screen display device according to the first embodiment can adaptively use three areas in the character generator ROM 400, i.e., commonly use the common area 1 and selectively use the areas 2 and 3 by utilizing the area designation flag that designates a predetermined area in the character generator ROM 400. Therefore, the increase in the number of types of characters can be achieved without enlarging the address area in the video RAM 200.

In this first embodiment, the address map of the video RAM 200 does not include a line attribute as will be described in a second embodiment of the present invention, while the address map may include the line attribute.

[Embodiment 2]

An on-screen display device according to a second embodiment of the present invention will be described with reference to FIGS. 2, 3 and 4.

Figure 3:
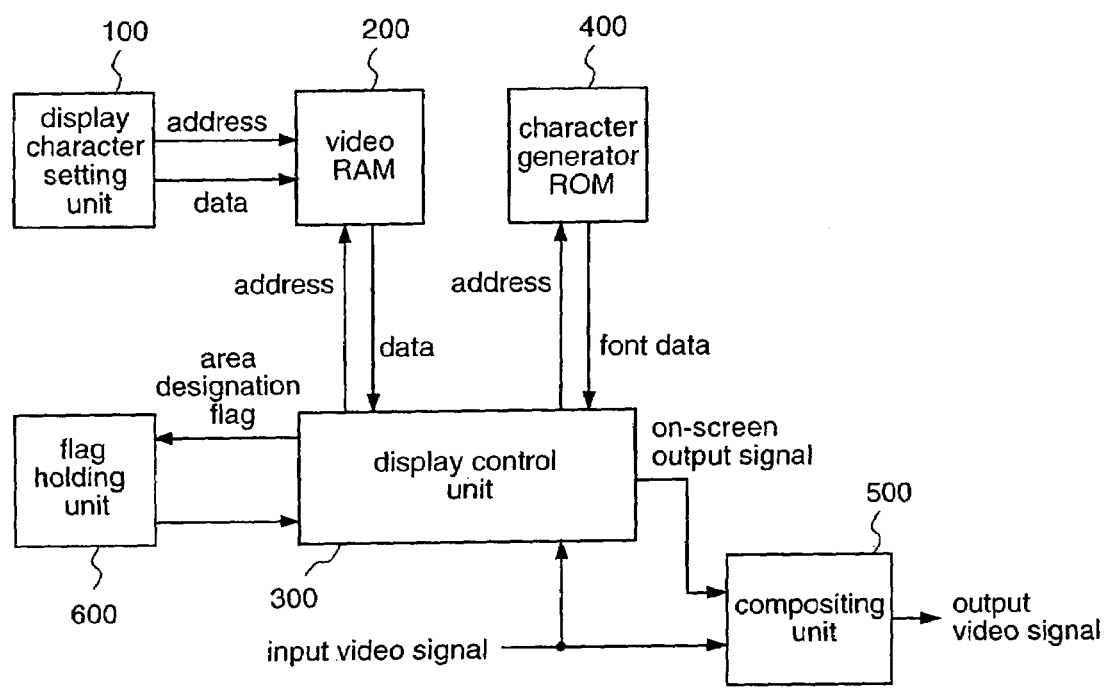
FIG. 3 is a diagram illustrating a structure of an on-screen display device according to a second or third embodiment of the present invention.

FIG. 3 is a diagram illustrating a structure of an on-screen display device according to the second embodiment. In FIG. 3, the same components as those in FIG. 1 are denoted by the same reference numerals.

Figure 4:
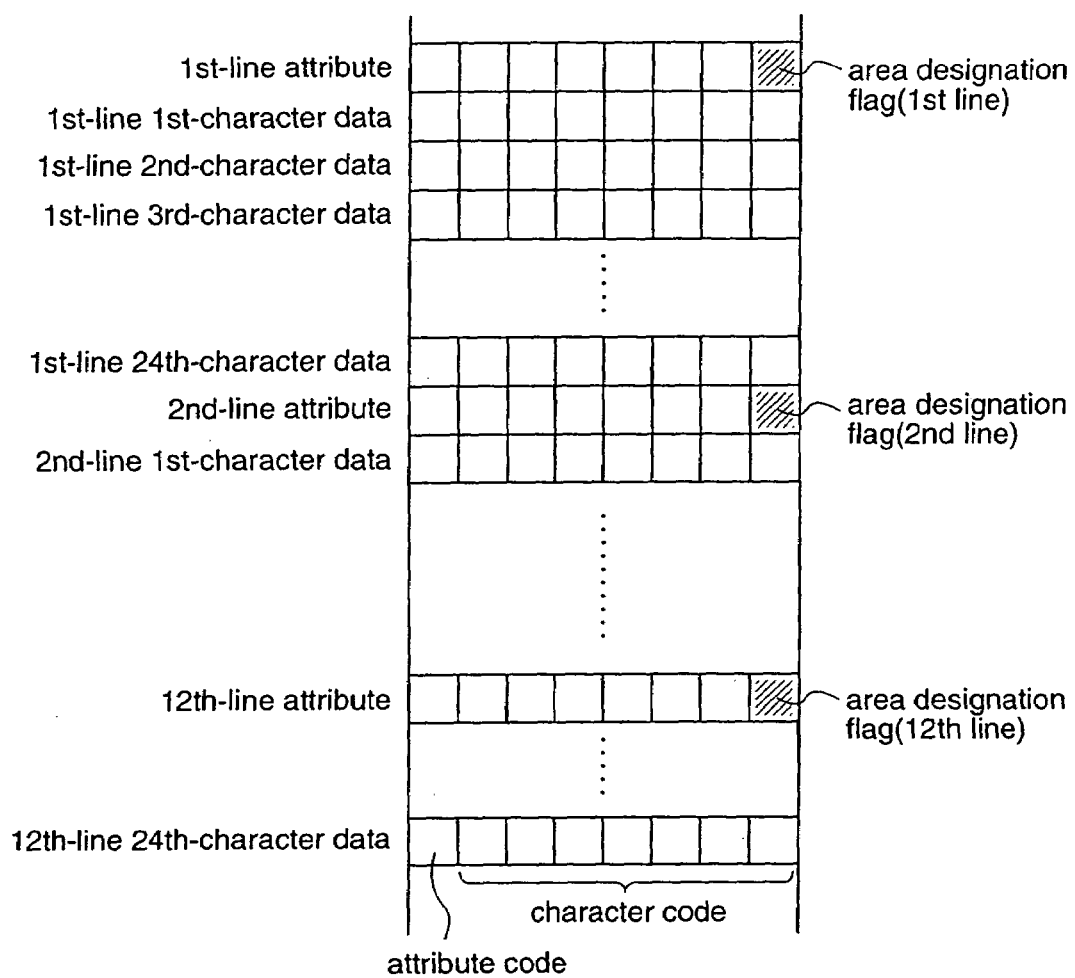
FIG. 4 is a diagram showing an address map of a video RAM in the on-screen display device according to the second embodiment.

FIG. 4 shows an address map of a video RAM 200 in the on-screen display device according to the second embodiment.

The address map of the video RAM contains addresses that indicate display positions on the display, respectively, and character data and line attribute codes of respective display characters. Each of the line attributes includes an area designation flag.

More specifically, in the case of characters that are to be displayed on the 1st line, the line attribute of the 1st line and character data of the 1st to 24th characters on, the 1st line are successively stored at predetermined addresses, respectively. In the case of characters that are displayed on the 2nd line, the line attribute of the 2nd line is stored at an address subsequent to the data of the 24th character on the 1st line, and subsequently character data of the 1st to 24th characters on the 2nd line are successively stored at predetermined addresses, respectively. In this way, line attributes up to the 12th line and respective character data are stored.

In this second embodiment, the address map of the character generator ROM 400 includes the common area 1 that stores font data of characters 1 to n, the area 2 that stores font data of characters n+1 to m, and the area 3 that stores font data of characters m+1 to s, as shown in FIG. 2 that has been described in the first embodiment.

The operation of the on-screen display device that is constituted as described above will be described.

First, the display character setting unit 100 writes character data and a line attribute code of a character that is to be displayed on the display, into the video RAM 200.

Then, the display control unit 300 reads the character data and the line attribute code that are written in the video RAM 200, at predetermined timings, respectively. As the area designation flag is included in the line attribute as shown in FIG. 4, the area designation flag included in the read line attribute is written in the flag holding unit 600, and the area designation flag is outputted from the flag holding unit 600 to the display control unit 300.

The display control unit 300 generates an address in the character generator ROM 400 corresponding to the character code included in the character data that has been read from the video RAM 200 and the area designation flag outputted from the flag holding unit 600, and reads font data from the generated address in the character generator ROM 400. Then, the display control unit 300 generates an on-screen output signal on the bases of the font data that has been read from the character generator ROM 400 and the attribute code included in the character data that has been read from the video RAM 200, and outputs the generated on-screen output signal in synchronization with an input video signal. Then, the compositing unit 500 composites the on-screen output signal and the input video signal to output the composite signal to the display.

The reading of font data that is stored at the respective address in the address map of the character generator ROM as shown in FIG. 2 is now described.

First, as for the characters 1 to n, font data corresponding to character codes 1 to n are read, regardless of the value of the area designation flag that is held in the flag holding unit 600.

As for the characters n+1 to m, font data corresponding to character codes n+1 to m (n<m) are read, respectively, when the area designation flag is 0.

Further, as for the characters m+1 to s, font data corresponding to character codes m+1 to s−m (m<s) are read, respectively, when the area designation flag is 1.

Accordingly, the number of types of the characters that can be displayed on one line is m or s−m+n, while the total number of types of the characters that can be displayed on plural lines is s.

On the other hand, the character code corresponding to one character, which is required in the video RAM 200 may be the larger one of $\log_2 m$ bits and $\log_2(s-m+n)$ bits, as described in the first embodiment.

As a specific example, font data of texts are stored in the common area 1. In FIG. 2, font data of some symbols are stored in the area 2, and font data of symbols that are not displayed on the same line as the symbols stored in the area 2 are stored in the area 3, whereby all characters can be displayed on one screen.

According to the on-screen display device of the second embodiment, character data and a line attribute code including an area designation flag of a display character are stored at respective addresses corresponding to a desired display position in the video RAM 200, then the display control unit 300 reads the line attribute code from the video RAM 200 to obtain the area designation flag included in the line attribute code, and adaptively uses the plural areas in the character generator ROM 400, i.e., commonly use the common area 1 and selectively use the areas 2 and 3 by utilizing the obtained area designation flag. Therefore, the increase in the number of types of characters can be achieved without enlarging the address area in the video RAM 200.

In this second embodiment, the area designation flag is 1 bit, while the area designation flag may be composed of any plural bits so long as the bits can represent any number that can designate areas in the character generator ROM.

[Embodiment 3]

An on-screen display device according to a third embodiment of the present invention will be described with reference to FIGS. 2, 3 and 7. In this third embodiment, descriptions are given with reference to FIG. 3 that has been described in the second embodiment as a diagram illustrating a structure of the on-screen display device, FIG. 2 that has been described in the first and second embodiments as an address map of the character generator ROM 400, and FIG. 7 that has been described in the prior art as an address map of the video RAM 200.

Hereinafter, the operation of the on-screen display device according to the third embodiment will be described.

First, the display character setting unit 100 writes data of a character that is to be displayed on the display, into the video RAM 200.

Then, the display control unit 300 reads the character data that has been written into the video RAM 200 at a predetermined timing.

When the character code included in the read character data is a code indicating an area designation flag, the display control unit 300 writes a value corresponding to the code into the flag holding unit 600 as the area designation flag, and read the subsequent character data. The area designation flag is outputted from the flag holding unit 600 to the display control unit 300.

On the other hand, when the character code included in the character data read from the video RAM 200 is not a code indicating the area designation flag, the display control unit generates an address in the character generator ROM 400 corresponding to the character code and the area designation flag outputted from the flag holding unit 600, and reads font data at the generated address in the character generator ROM 400. Then, the display control unit 300 outputs an on-screen output signal on the basis of the font data read from the character generator ROM 400 and the attribute code read from the video RAM 200, in synchronization with an input video signal. Then, the compositing unit 500 composites the on-screen output signal and the input video signal, to output the composite signal to the display.

Here, the reading of the font data that are stored at the respective addresses in the address map of the character generator ROM in FIG. 2 will be described.

First, as for characters 1 to n, font data corresponding to character codes 1 to n are read, respectively, regardless of the value of the area designation flag that is held in the flag holding unit 600.

As for characters n+1 to m, font data corresponding to character codes n+1 to m (n<m) are read, respectively, when the area designation flag is 0.

Further, as for characters m+1 to s, font data corresponding to character codes m+1 to s−m (m<s) are read, respectively, when the area designation flag is 1.

Accordingly, when characters whose font data are stored in different areas in the character generator ROM 400 are displayed, a space corresponding to one character is displayed between these characters, while the number of types of characters that can be displayed on one screen is s.

On the other hand, the character code corresponding to one character, which is required in the video RAM 200 may be the larger one of $\log_2(m+t)$ bits and $\log_2(s-m+n+t)$ bits, including an area designation flag t that indicates the area designation flag. For example, when n=62 and t=2, as the character code is composed of 7 bits and the attribute code is 1 bit in the example shown in FIG. 2 or 7, $m \leq 2^7 - t = 126$ and $s \leq 2(2^7 - t) - n = 190$. Therefore, characters of up to 190 types can be displayed on the screen, and the area in the video RAM area which is used for one character can be realized by 8 bits.

The aforementioned on-screen display device according to the third embodiment employs a part of plural character codes as a code that indicates an area designation flag, and stores character data of a display character at an address corresponding to a desired display position in the video RAM 200. Then, the display control unit 300 reads the character data from the video RAM 200, and when the character code included in the character data is a code indicating an area designation flag, adaptively uses the plural areas in the character generator ROM 400, i.e., commonly uses the common area 1 and selectively uses the areas 2 and 3 by utilizing the area designation flag indicated by the area designation flag code. Therefore, the increase in the number of types of characters can be achieved without enlarging the address area in the video RAM 200.

In this third embodiment, when the character code included in the character data read by the display control unit 300 is a code indicating the area designation flag, the display control unit 300 writes an attribute code included in the read character code into the flat holding unit 600 as the area designation flag. However, since the area designation flag has a binary value, when the character code included in the character data read by the display control unit 300 is a code indicating the area designation flag, the above-mentioned effect can be also achieved by changing the value of the area designation flag that is held in the flag holding unit 600 into the opposite value. In this case, t=1 and accordingly characters up to 191 types can be displayed on the screen.

In this third embodiment, the address map of the video RAM 200 does not include the line attribute, while an address map including the line attribute can achieve the same effect.

Figure 5:
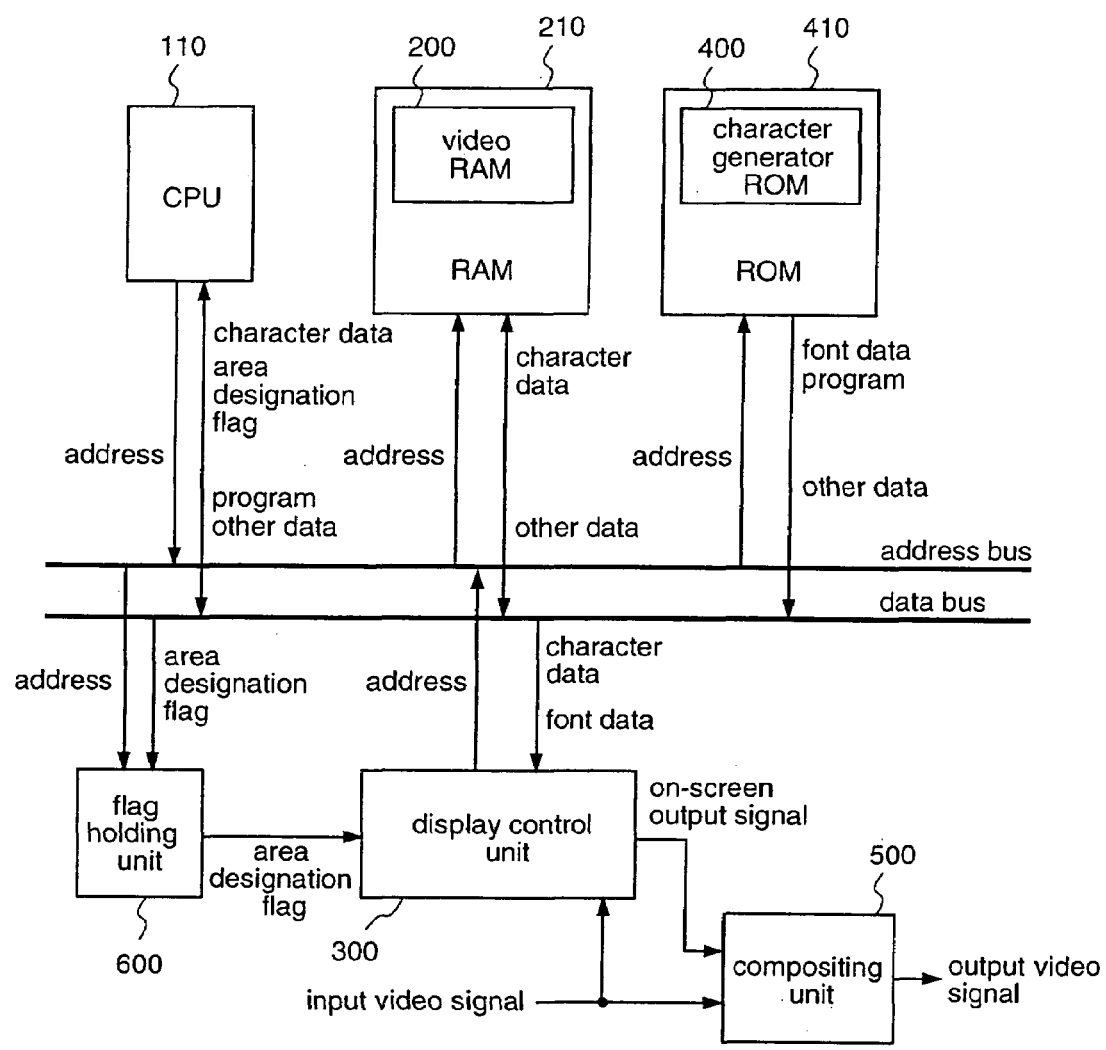
FIG. 5 is a diagram illustrating a structure of an on-screen display device in a case where a display character setting unit of the on-screen display device according to any of the first to third embodiment is constituted by a CPU, a video RAM is included in a RAM of the device, and a character generator ROM is included in a ROM of the device.

In the on-screen display device according to any of the first to third embodiments, the display character setting unit 100 can be implemented by a CPU (central processing unit). For example, as shown in FIG. 5, when the display character setting unit 100 is constituted by a CPU 110, the video RAM 200 is included in a RAM 210, the character generator ROM 400 is included in a ROM 410, and reading or writing of data into/from the video RAM 200 or the character generator ROM 400 is performed via a common address bus or data bus, the bit length of character data that are read or write into/from the video RAM 200 can be matched with the bit length of data for the RAM 210, resulting in an efficient size of the video RAM.

In the first to third embodiments, it is assumed that the character data is composed of 8 bits, the character code is composed of 7 bits, and the attribute code is 1 bit, while these data and codes may be composed of any number of bits.

Further, in the first to third embodiments, 12 lines of 24 characters can be displayed on one screen, while another number of lines and characters may be displayed.

In the first to third embodiments, the character generator ROM 400 is constituted by three areas, i.e., the common area 1, the area 2, and the area 3, while the character generator ROM may be constituted by more than three areas.

Further, in the first to third embodiments, one of the three areas in the generator ROM 400 is employed as a common area, and one of the remaining areas is selected by the area designation flag, while two of the three areas may be selected by the area designation flag without providing a common area.

What is claimed is:

1. An on-screen display device that provides an on-screen display of a display character, including:
   a character generator ROM having n pieces of areas from 1st to n-th areas (n is an integer that is equal to or larger than 3), and storing predetermined font data in the respective areas;
   a flag holding unit for outputting an area designation flag that designates a desired number of areas among the n pieces of areas in the character generator ROM;
   a display character setting unit for writing a desired character code at a predetermined position in a video RAM; and
   a display control unit for reading the character code from the video RAM, reading font data corresponding to the character code from an area designated by the area designation flag in the character generator ROM, and outputting an on-screen output signal using the font data at a predetermined timing with respect to an input video signal.

2. The on-screen display device as defined in claim 1 wherein
   the display character setting unit writes the area designation flag into the flag holding unit, and
   the flag holding unit outputs the area designation flag which was written by the display character setting unit.

3. The on-screen display device as defined in claim 1 wherein
   the display character setting unit writes a desired character code and a line attribute including the area designation flag into the video RAM,
   the display control unit reads the line attribute from the video RAM at the start of a line to be displayed, and writes the area designation flag included in the line attribute that has been read from the video RAM, into the flag holding unit, and
   the flag holding unit outputs the area designation flag which was written by the display control unit.

4. The on-screen display device as defined in claim 1 wherein
   (n−1) codes (n denotes the number of areas in the character generator ROM) among plural character codes are area designation flag codes corresponding to the area designation flag, and
   when the character code read from the video RAM is the area designation flag code, the display control unit writes the area designation flag corresponding to the area designation flag code into the flag ho ding unit, and
   the flag holding unit outputs the area designation flag which was written by the display control unit.

5. The on-screen display device as defined in claim 1 wherein
   one of plural character codes is an area designation flag code, and
   in cases where the character code read from the video RAM is the area designation flag code,
   when the output from the flag holding unit is an area designation flag that designates the second area, the display control unit writes the area designation flag that designates the third area into the flag holding unit while, when the output from the flag holding unit is an area designation flag that designates the third area, writing the area designation flag that designates the second area into the flag holding unit, and
   the flag holding unit outputs the area designation flag which was written by the display control unit.

6. An on-screen display device that provides an on-screen display of a display character, including:
   a character generator ROM having n pieces of areas from 1st to n-th areas (n is an integer that is equal to or larger than 3), and storing predetermined font data in the respective areas;
   a flag holding unit for outputting an area designation flag that designates any of the 2nd to n-th areas among the n pieces of areas in the character generator ROM;
   a display character setting unit for writing a desired character code at a predetermined position in a video RAM; and
   a display control unit for reading the character code from the video RAM, and when the area designation flag outputted from the flag holding unit designates the second area, reading respective font data corresponding to the character code that has been read from the video RAM, from the first and second areas in the character generator ROM, while when the area designation flag outputted from the flag holding unit designates the third area, reading respective font data corresponding to the character code that has been read from the video RAM, from the first and third areas in the character generator ROM, and outputting an on-screen output signal using the read font data at a desired timing with respect to an input video signal.

7. The on-screen display device as defined in claim 6 wherein the display character setting unit writes the area designation flag into the flag holding unit, and the flag holding unit outputs the area designation flag which was written by the display character setting unit.

8. The on-screen display device as defined in claim 6 wherein the display character setting unit writes a desired character code and a line attribute including the area designation flag into the video RAM, the display control unit reads the line attribute from the video RAM at the start of a line to be displayed, and writes the area designation flag included in the line attribute that has been read from the video RAM, into the flag holding unit, and the flag holding unit outputs the area designation flag which was written by the display control unit.

9. The on-screen display device as defined in claim 6 wherein (n−1) codes (n denotes the number of areas in the character generator ROM) among plural character codes are area designation flag codes corresponding to the area designation flag, and when the character code read from the video RAM is the area designation flag code, the display control unit writes the area designation flag corresponding to the area designation flag code into the flag ho ding unit, and the flag holding unit outputs the area designation flag which was written by the display control unit.

10. The on-screen display device as defined in claim 6 wherein one of plural character codes is an area designation flag code, and in cases where the character code read from the video RAM is the area designation flag code, when the output from the flag holding unit is an area designation flag that designates the second area, the display control unit writes the area designation flag that designates the third area into the flag holding unit while, when the output from the flag holding unit is an area designation flag that designates the third area, writing the area designation flag that designates the second area into the flag holding unit, and the flag holding unit outputs the area designation flag which was written by the display control unit.

* * * * *